USOO5552641A

United States Patent [19]
Fischer et al.

[11] Patent Number: 5,552,641
[45] Date of Patent: Sep. 3, 1996

[54] REMOTE-CONTROL ACCESS CONTROL DEVICE AND METHOD FOR OPERATING THE SAME

[75] Inventors: Robert Fischer, Kelheim; Johannes Ilg; Christian Schneider, both of Regensburg; Ulrich Schrey, Laaber Ot Waldetzenberg, all of Germany

[73] Assignee: Siemens Aktiengesellschaft, Munich, Germany

[21] Appl. No.: 300,480

[22] Filed: Sep. 2, 1994

[30] Foreign Application Priority Data

Sep. 2, 1993 [DE] Germany .................. 43 29 697.1

[51] Int. Cl.⁶ .................................. B60R 25/00
[52] U.S. Cl. .............. 307/10.5; 180/287; 340/825.72
[58] Field of Search .................. 307/10.1–10.6; 180/287, 289; 70/264, 256; 340/425.5, 426, 825.31, 825.32, 542, 825.69, 825.72–825.74; 361/172

[56] References Cited

U.S. PATENT DOCUMENTS

| | | | |
|---|---|---|---|
| 4,738,334 | 4/1988 | Weishaupt | 307/10.5 |
| 4,763,121 | 8/1988 | Tomoda et al. | 340/825.69 |
| 4,794,268 | 12/1988 | Nakano et al. | 340/825.69 |
| 4,940,964 | 7/1990 | Dao | 307/10.4 |
| 4,942,393 | 7/1990 | Waraksa et al. | 340/825.72 |
| 5,023,605 | 6/1991 | McCall | 340/825.31 |
| 5,280,267 | 1/1994 | Reggiani | 340/426 |

FOREIGN PATENT DOCUMENTS

| | | |
|---|---|---|
| 0440974 | 8/1991 | European Pat. Off. |
| 3225039 | 1/1984 | Germany . |
| 3446245 | 6/1985 | Germany . |
| 3530834 | 3/1987 | Germany . |
| 3536377 | 4/1987 | Germany . |

Primary Examiner—William M. Shoop, Jr.
Assistant Examiner—Richard T. Elms

[57] ABSTRACT

A remote-control access control device, particularly for motor vehicles, includes a stationary transmitter and receiver unit responding to actuation of tripping means for transmitting a question code signal, receiving an answer code signal, and furnishing an unlocking signal to an unlocking unit if the answer code signal matches a command code signal. A portable transponder has a receiver receiving the question code signal and a transmitter transmitting the answer code signal. The question code signal is repeatedly transmitted if no answer code signal has been received in response to an initial transmission, and a signal parameter is modified upon transmission of the answer code signal as a function of a field intensity of the question code signal or of a battery voltage of the transponder. Alternatively, a signal parameter is modified when the answer code signal is transmitted if an information content of the question code signal indicates an emergency operation state. As another alternative, the transmitter and receiver unit has both a transmission channel for receiving signals of low field intensity and a transmission channel for receiving signals of high field intensity. A method is also provided for operating the access control device.

26 Claims, 3 Drawing Sheets

REMOTE-CONTROL ACCESS CONTROL DEVICE AND METHOD FOR OPERATING THE SAME

BACKGROUND OF THE INVENTION

FIELD OF THE INVENTION

The invention relates to a remote-control access control device and a method for operating the device, particularly for a motor vehicle. The device has a stationary transmitter and receiver unit and a portable transponder. An unlocking unit, such as a central locking system, can be controlled with the aid of bidirectional dialog between the transmitter unit, the transponder, and the receiver unit.

Such an access control device is known from Published European Application No. 0 440 974 A1. In that device, a transponder and a transmitter and receiver unit with a question and answer dialog is used to identify a vehicle user and to unlock the vehicle if the user is authorized. Demarcation of the operative range for certain functions of the access control device is assured by providing a short range of the transmitter unit signals, while the transponder, with its wide range, can perform additional functions as well.

In any case, such a device must have recourse to a mechanical key with which the vehicle can be unlocked, if problems arise in the question and answer dialog between the transponder and the vehicle. Such problems may, for instance, be a drop below an allowable threshold in the supply voltage of the transponder or of the transmitter and receiver unit, or interference from an interfering transmitter broadcasting in the immediate vicinity.

SUMMARY OF THE INVENTION

It is accordingly an object of the invention to provide a remote control access control device and a method for operating the same, which overcome the hereinafore-mentioned disadvantages of the heretofore-known devices and methods of this general type and with which a question and answer dialog between a transponder and a transmitter and receiver unit is set in motion in order to lock or unlock an unlocking unit, even if there are problems or interference in the transmission path or if the voltage supply is inadequate.

With the foregoing and other objects in view there is provided, in accordance with the invention, a remote-control access control device, particularly for a motor vehicle, comprising tripping means; an unlocking unit; a stationary transmitter and receiver unit responding to actuation of the tripping means for transmitting a question code signal with a field intensity, receiving an answer code signal, and furnishing an unlocking signal to the unlocking unit if the answer code signal matches a command code signal; a portable transponder having a receiver receiving the question code signal, a transmitter transmitting the answer code signal, and a battery voltage; and means for repeatedly transmitting the question code signal if no answer code signal has been received in response to an initial transmission, and for modifying a signal parameter upon transmission of the answer code signal as a function of the field intensity of the question code signal or of the battery voltage of the transponder.

With the objects of the invention in view, there is also provided a remote-control access control device, particularly for a motor vehicle, comprising tripping means; an unlocking unit; a stationary transmitter and receiver unit responding to actuation of the tripping means for transmitting a question code signal, receiving an answer code signal, and furnishing an unlocking signal to the unlocking unit if the answer code signal matches a command code signal; a portable transponder having a receiver receiving the question code signal and a transmitter transmitting the answer code signal; and means for modifying a signal parameter when the answer code signal is transmitted if an information content of the question code signal indicates an emergency operation state.

In accordance with another feature of the invention, the transmitter and receiver unit has at least two transmission channels for receiving signals with different signal parameters.

With the objects of the invention in view, there is additionally provided a remote-control access control device, particularly for a motor vehicle, comprising tripping means; an unlocking unit; a stationary transmitter and receiver unit responding to actuation of the tripping means for transmitting a question code signal, receiving an answer code signal, and furnishing an unlocking signal to the unlocking unit if the answer code signal matches a command code signal; and a portable transponder having a transmitter transmitting the answer code signal and a receiver receiving the question code signal; the transmitter and receiver unit having both a transmission channel for receiving signals of low field intensity and a transmission channel for receiving signals of high field intensity.

In accordance with a further feature of the invention, the answer code signal is received simultaneously by both of the transmission channels.

Through the use of a stationary transmitter unit, a question code signal is transmitted by actuation of tripping means. As a consequence, a portable transponder that has a transmitter and a receiver is activated and in turn transmits an answer code signal.

A stationary transmitter and receiver unit sends an unlocking signal to an unlocking unit if the answer code signal matches a command code signal. Depending on the field intensity or the encoding of the question code signal, the answer code signal may be transmitted by the transponder in a different transmission mode, or in other words with a modified signal parameter. The signal parameters are the range, frequency, field intensity or baud rate, for instance, of the transmitted signals. The transmitter and receiver unit in turn has the capability of evaluating the answer code signal with receivers of different sensitivity or with receivers with different transmission modes.

In accordance with again another feature of the invention, the tripping means for tripping the question code signal and therefore for transmitting the answer code signal may be a key of the transponder, a door handle of the motor vehicle, or a question code signal that is transmitted cyclically at certain time intervals by the transmitter and receiver unit.

In accordance with again a further feature of the invention, the transponder has an emergency voltage source, in which some of the energy contained in the question code signal is buffer-stored or withdrawn if the energy supplied by the transponder battery is inadequate. That energy suffices to transmit the answer code signal. The stationary transmitter and receiver unit may have a plurality of receivers with different sensitivity and/or one receiver that can receive different kinds of signals.

In accordance with again an added feature of the invention, the transmitter and receiver unit is connected to an emergency voltage source that supplies the transmitter and receiver unit and portions of the central locking system with energy as needed if a main voltage source fails. Thus the unlocking unit can be actuated at least once if the answer code signal matches the command code signal.

With the objects of the invention in view, there is furthermore provided a method for operating a remote-control access control device, particularly for a motor vehicle, which comprises transmitting a question code signal from a stationary transmitter and receiver unit upon actuation of tripping means; receiving the question code signal at a transponder and transmitting an answer code signal from the transponder to the transmitter and receiver unit; comparing the answer code signal with a command code signal in the transmitter and receiver unit, and sending an unlocking signal to an unlocking unit if the answer code signal and the command code signal match; bringing the transponder to the vicinity of the transmitter and receiver unit if no unlocking signal has been tripped after an initial actuation of the tripping means; and actuating the tripping means once again for transmitting the question code signal.

The access control device can also be used to prevent the vehicle from being driven. In that case the transponder must be in the vehicle interior. It is only if the user is authorized, or in other words if the question and answer dialog is successful, that the motor can be started.

In accordance with a concomitant mode of the invention, there is provided a method which comprises transmitting a further question code signal from the transmitter and receiver unit if further tripping means are actuated, thereupon transmitting a further answer code signal from the transponder if the transponder is detected as being located inside a motor vehicle, and transmitting an engine starting signal from a control unit disposed in the vehicle, if the answer code signal matches a command code signal.

Other features which are considered as characteristic for the invention are set forth in the appended claims.

Although the invention is illustrated and described herein as embodied in a remote control access control device and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
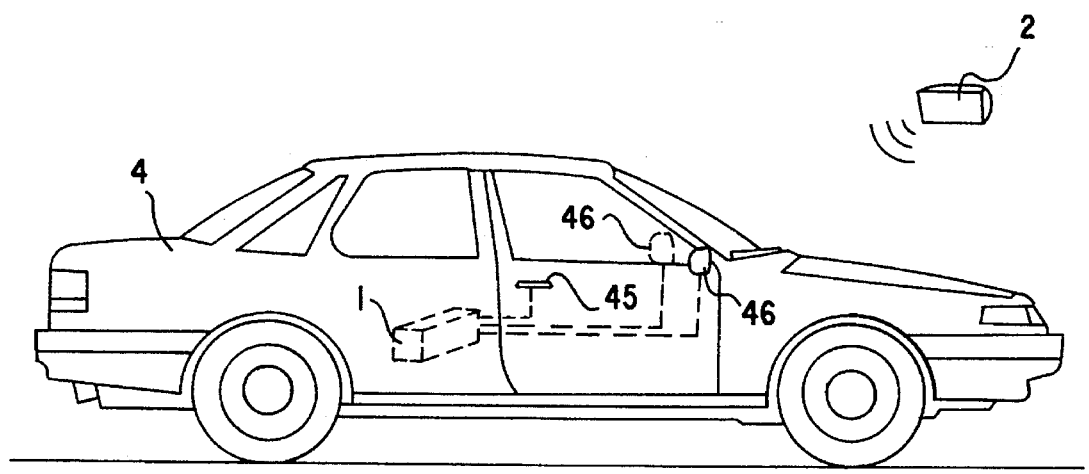
FIG. 1 is a diagrammatic, side-elevational view of a motor vehicle with an access control device according to the invention.

Referring now to the figures of the drawing in detail and first, particularly, to FIG. 1 thereof, there is seen a keyless, remote-control access control device, which will be described in further detail below by taking its use in a motor vehicle as an example. A stationary transmitter and receiver unit 1 is disposed in a motor vehicle 4. Through the use of a transmitting and receiving antenna, for instance located in an outside mirror 46 or in a driver-side door, the unit 1 can enter into wireless communication by means of a question and answer dialog with a portable transponder 2, that is located at some distance from the motor vehicle 4. A check is performed as to whether the user of the transponder 2 is authorized to unlock or lock the vehicle.

The transmitter and receiver unit 1 is connected to a door handle 45, for instance, which causes the transmitter and receiver unit 1 to begin the question and answer dialog with the transponder 2 through a bidirectional communications path.

Figure 2:
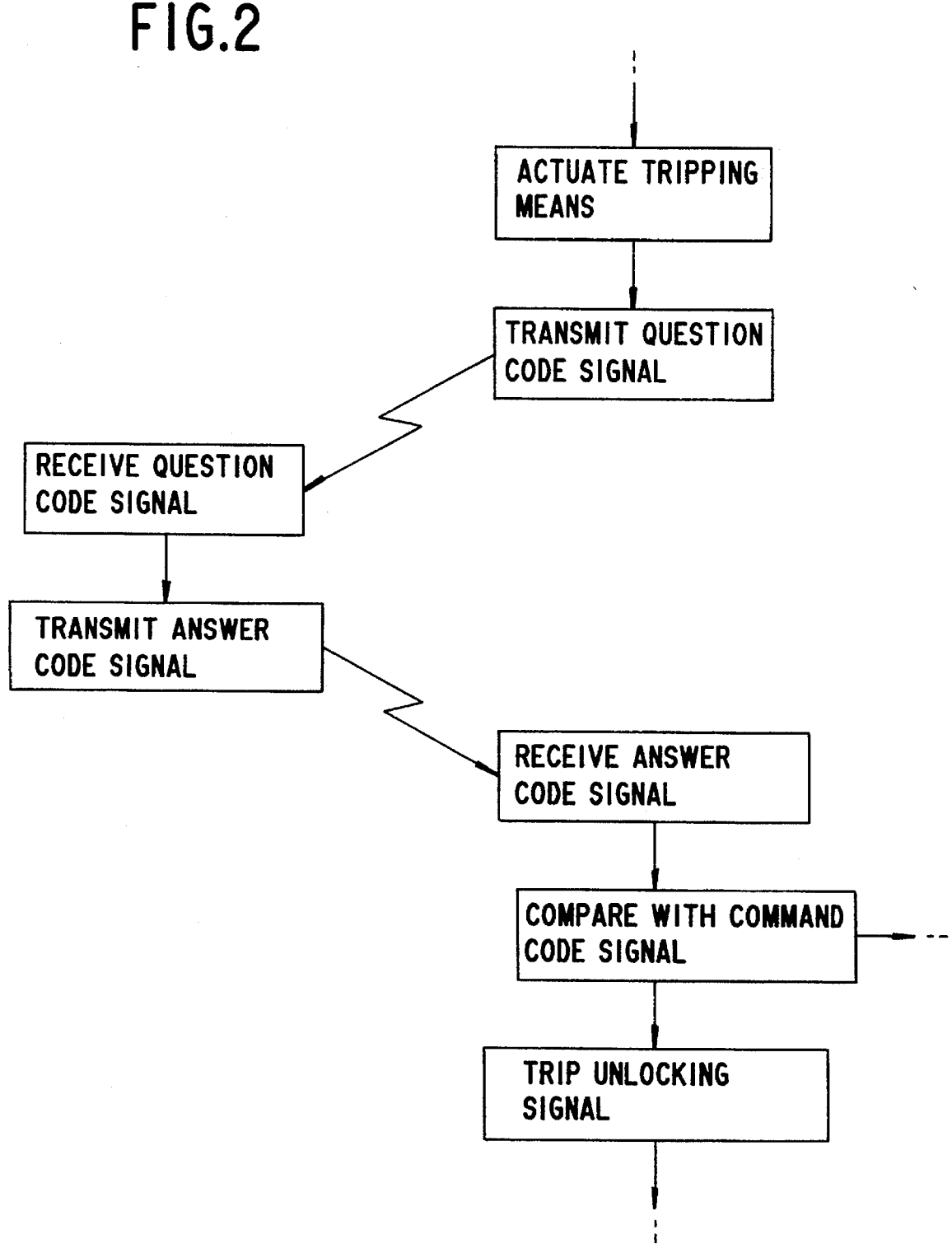
FIG. 2 is a flow chart of a question and answer dialog between a transponder and a transmitter and receiver unit.

The question and answer dialog for unlocking or locking the vehicle with be described in further detail in conjunction with FIG. 2. The door handle 45 serves as tripping means. After its actuation, the transmitter and receiver unit transmits a question code signal (represented in the flow chart by a lightning-bolt-like arrow). The question code signal is received by the transponder 2. This "wakes up" the transponder 2. In other words, if the transponder 2 receives the question code signal and perceives itself to be addressed, it reacts, and in turn transmits an answer code signal.

The answer code signal is received by the transmitter and receiver unit 1, where it is compared with an expected command code signal. If the user of the transponder 2 is authorized, or in other words if the answer code signal matches the command code signal, an unlocking signal is tripped. This activates the central locking system, and the doors of the vehicle 4 are unlocked.

In order to increase the security against eavesdropping of the question and answer dialog, the question code signal and the answer code signal may be changed continuously in accordance with a specified algorithm. This is called a changing code. This need not be addressed in further detail herein, since the generation of code signals is not essential to the invention and is adequately well known on its own.

Figure 3:
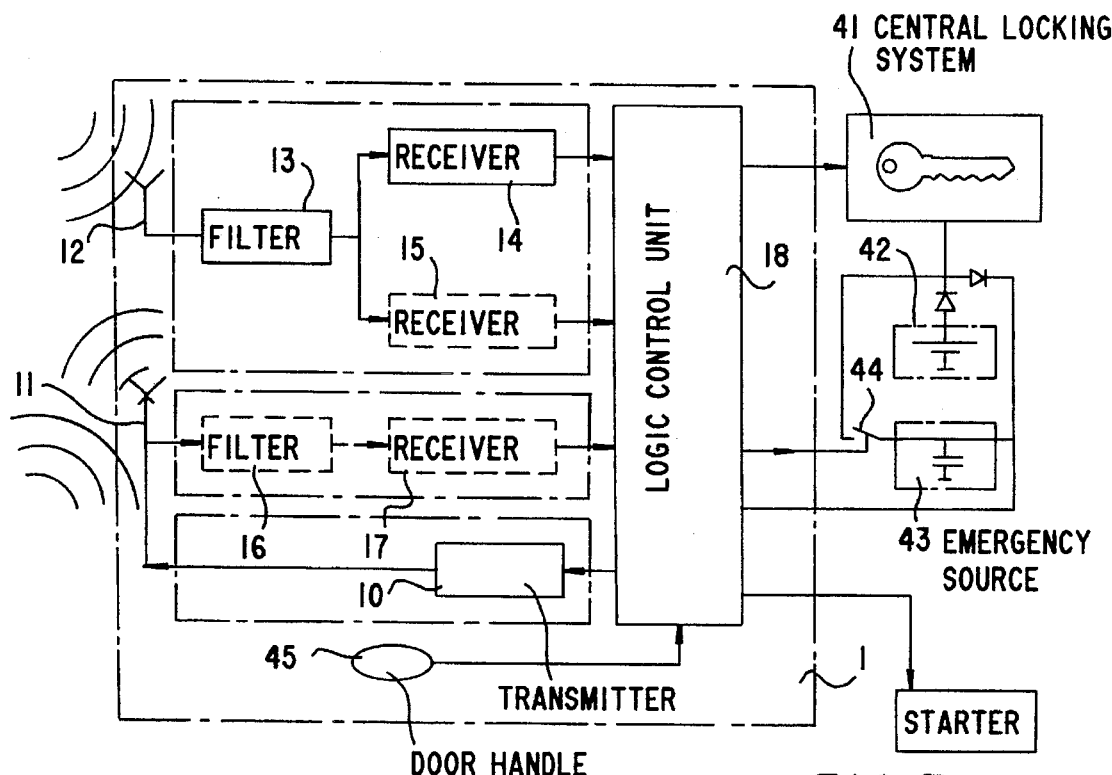
FIG. 3 is a schematic and block circuit diagram of a stationary transmitter and receiver unit.

The stationary transmitter and receiver unit 1 shown in FIG. 3 has a transmitter 10, which can transmit the question code signal through an antenna 11. The answer code signal is received by a further antenna 12 and carried to a receiver 14 through an input filter 13. A further receiver 15, which differs in its reception sensitivity from the first receiver 14, may be disposed parallel to the receiver 14. Since this further receiver is merely optional, it is shown in dashed lines in FIG. 3.

The antenna 11 may also act as a receiving antenna. In that case the received signals are carried through an input filter and shunt 16 to a receiver 17. The antennas 11 and 12 are constructed for different modes of transmission. The antenna 12, the input filter 13 and the receivers 14 and 15 thus represent a first transmission channel. The antenna 11, the input filter 16 and the receiver 17 represent a second transmission channel, while the antenna 11 and the transmitter 10 represent a third transmission channel.

The transmission channels differ in that signals with modified signal parameters, such as field intensity, range, frequency, baud rate or transmission mode can be sent or received. In the transmission mode, a distinction can be made between HF signals and LF signals, for instance. One transmission channel may be constructed for HF signals, for instance, while the other is constructed for LF signals. Alternatively, one transmission channel is dimensioned for HF signals of high field intensity and another one is dimensioned for HF signals of low field intensity.

A logic circuit or control unit 18 is connected to the receivers 14, 15 and 17 and with the transmitter 10. In the logic circuit, the question code signal is generated if the door handle 45, which is likewise connected to the logic circuit 18, is actuated. The answer code signal that is received is compared with the expected command code signal in the logic circuit 18. If they match, the unlocking signal is sent to the central locking system 41.

The stationary transmitter and receiver unit 1 and the central locking system 41 are supplied with energy through a vehicle battery 42. An emergency voltage source 43 may be disposed parallel to the vehicle battery 42 and if the vehicle battery 42 fails it supplies the transmitter and receiver unit 1 and the central locking system 41 with energy as needed.

Figure 4:
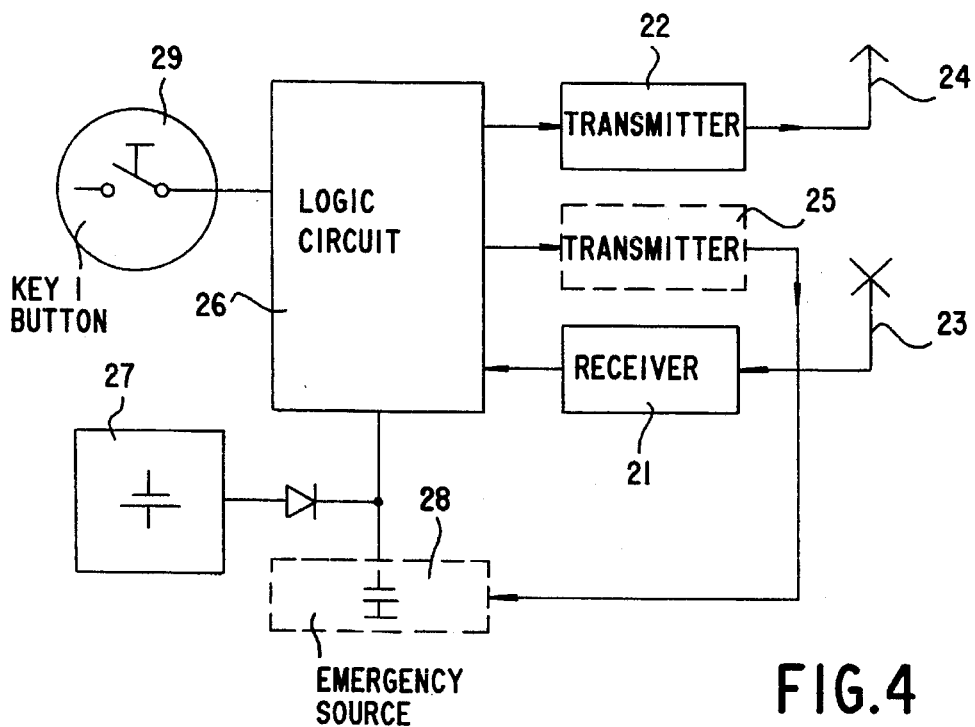
FIG. 4 is a schematic and block circuit diagram of a portable transponder.

The portable transponder 2 seen in FIG. 4 in turn has a receiver 21 and a first transmitter 22, which are each connected to a respective antenna 23 and 24. A second transmitter 25 may be disposed parallel to the first transmitter 22, but then uses the antenna 23 for transmitting signals.

The transponder may also have a plurality of different transmission channels, which may differ in terms of the transmission mode, the frequency, the field intensity, and so forth of the transmitted or received signals. The transmitter 22 and the antenna 24, the transmitter 25 and the antenna 23, and the receiver 21 and the antenna 23 each form one respective transmission channel.

The transmitters 22 and 25 and the receiver 21 are connected to a logic circuit 26, in which the answer code signal is generated. The logic circuit 26 is supplied with energy by a battery 27, for instance in the form of a round cell. The transponder 2 may also have an emergency voltage source 28, such as an accumulator or a rectifier with a capacitor, which supplies the logic circuit 26 with energy as needed if the battery 27 fails.

In addition, the transponder 2 may have a key or button 29 as tripping means for transmitting the answer code signal.

The transmission power and the reception sensitivity of the transmitter and receiver unit 1 and of the transponder 2 are adapted to one another in such a way that not only can the transponder 2 receive signals of the transmitter 10 but the receivers 14, 15 and 17 can reliably receive signals from the transponder 2, if the transponder 2 is in the immediate vicinity of the vehicle 4.

Since the transponder 2 is advantageously constructed as a chip card, its transmission power is limited by certain parameters, such as the housing dimensions, antenna size or current consumption. In normal operation, it transmits at the maximum possible transmission power. The maximum range of a signal transmitted by the transponder 2 is on the order of approximately 30 m. In contrast, signals from the transmitter and receiver unit 1 to the transponder 2 may be limited to a range of only a few meters.

In normal operation, the access control device uses a single transmission channel from the vehicle 4 to the transponder 2 and one transmission channel from the transponder 2 to the vehicle 4. These two transmission channels may differ in type, for instance in terms of the field intensity, transmission mode, baud rate, etc. of the signals transmitted. The question code signal may, for instance, be transmitted inductively from the vehicle 4 to the transponder 2, while conversely the answer code signal is transmitted to the vehicle in the form of HF signals.

If the vehicle 4 is not unlocked by an authorized user carrying the transponder 2 with him or her after the tripping means has been actuated for the first time, then some error must have occurred. The transmission path between the transponder 2 and the transmitter and receiver unit 1 may be experiencing interference from a stronger interfering transmitter, such as a radio transmitter broadcasting in the general vicinity of the vehicle 4.

However, the voltage of the vehicle battery 42 may also have been dropped to an impermissible value, or the vehicle battery 2 may be completely disconnected, so that no question code signal can be generated in the transmitter and receiver unit 1. The voltage of the battery 27 in the transponder 2 may also have dropped below a threshold value, so that it is no longer possible to transmit the answer code signal.

In order not to restrict the safety achieved by the access control device, the access control device must function properly to open the vehicle without mechanical keys even in the case of an error or in other words including in an emergency. If such an error occurs, then the transponder 2 must be moved to the immediate vicinity of the antennas 11 or 12, or in other words in the immediate vicinity of the vehicle 4. In order to begin the question and answer dialog again, the tripping means, that is the door handle 45 or the key 29, must be actuated once again.

Nevertheless, if an error has occurred, such important actions as unlocking the car or starting the engine can be enabled by using other transmission channels for signal transmission, which is done by changing signal parameters as a function of the field intensity or the encoding of the question code signal or the answer code signal. In this kind of emergency operation situation, other hardware components may also be used. The components that are not absolutely necessary during normal operation are shown in dashed lines in FIGS. 3 and 4.

The access control device according to the invention will be described below in further detail with respect to the various possibilities of error.

First, let it be assumed that the vehicle battery 42 has run down or been disconnected. After the transponder 2 has been brought close to the vehicle 4, the key 29 must be actuated so that an answer code signal is sent to the vehicle 4. The stationary transmitter and receiver unit 1 is located in a state of repose, since it has already detected that the battery voltage has dropped below a threshold.

The logic circuit 18 is in a so-called sleep mode then, and the receivers 14, 15 or 17 are in the pure detector state. The state of repose is distinguished by an extremely low current consumption.

As soon as the answer code signal has been received by a receiver 14, 15 or 17 in the detector state, the corresponding receiver can take enough energy from the answer code signal of the transponder to suffice to "wake up" the logic circuit 18. The emergency voltage source 43 is connected to the transmitter and receiver unit 1. The received answer code signal is compared with the command code signal, and if they match, the central locking system 41 is briefly connected to voltage through a switch 44. This puts the central locking system 41 into the desired state. After that, all of the components return to the state of repose.

The emergency voltage source 43 may be an accumulator or a capacitor, which in normal operation is charged by the vehicle battery 42.

If the battery 27 of the transponder 2 has run down or been removed from the transponder 2, then an answer code signal cannot be sent. If the transponder 2 is brought to the immediate vicinity of the vehicle 4 and the door handle 45 is actuated, then because of the closeness of the transponder 2 to the vehicle 4 the field intensity of the question code signal is so high that it is above a threshold. In addition, energy can be drawn from the question code signal, so as to transmit at least a portion of the answer code signal. From the answer code signal received, the transmitter and receiver unit 1 recognizes the emergency operation state (for example the low field intensity, the incomplete answer code signal, or the encoding, or in other words the information content of the answer code signal), and by means of prolonged or repeated transmission of a high-energy question code signal, it assures that the transponder 2 can draw enough energy from the question code signal to transmit a complete answer code signal over one of its transmission channels.

If the battery 27 of the transponder 2 has run down, it is also possible for the actuation of the tripping means to last longer. From this, the transmitter and receiver unit 1 immediately recognizes that an emergency operation state is involved, and together with the question code signal it transmits enough energy that a complete answer code signal can be transmitted from the transponder 2.

Another error may be interference or a problem in the transmission path between the transponder 2 and the vehicle 4. In this case as well, the transponder 2 must be brought to the immediately vicinity of the vehicle 4 and the tripping means, such as the door handle, must be actuated. The answer code signal is transmitted once again. Since the transponder 2 is located in the vicinity of the antenna 12, the answer code signal is above a threshold, and it is properly coupled in.

The answer code signal may be received by both the receiver 14 and the less sensitive receiver 15. Both signals are evaluated by the logic circuit 18. If the interference or problem in the transmission path can be ascribed to an answer code signal of overly low field intensity, or in other words if the answer code signal was too weak, then only the receiver 14 with the high reception sensitivity furnishes a usable signal to the logic circuit 18. However, if the problem or interference in the transmission path should be ascribed to an interference signal superimposed on the answer code signal, then only the receiver 15 with low reception sensitivity furnishes a usable signal, which is evaluated by the logic circuit 18.

If a question code signal with high field intensity is received, the transponder 2 can transmit the answer code signal through the transmission channel that has the transmitter 25 and the antenna 23. This transmission channel may be constructed for inductive transmission, while conversely the transmission channel having the transmitter 22 and the antenna 24 may be constructed for high-frequency signals. In that case, the answer code signal is received with the antenna 11 and the receiver 17. The interfering signal can no longer have any effect, since the receiver 17, with its input filter and shunt 16, is constructed in such a way that it can no longer receive the interfering signal. The antennas 11 and 23 can accordingly be used both for transmission and for reception.

However, in the case of error, the transponder can also transmit the answer code signal simultaneously over various transmission channels. It can then be received by one or two transmission channels of the transmitter and receiver unit 1 and evaluated in the logic circuit.

If the transmission path from the vehicle 4 to the transponder 2 is interfered with, then once again the transponder 2 must be brought to the immediate vicinity of the antennas 11 or 12 of the transmitter and receiver unit 1. If the problem or interference is due to a question code signal transmitted with inadequate field intensity or power, or an insensitive receiver 21 of the transponder 2, then the approach of the transponder 2 to the vehicle 4 may already provide some help, if the tripping means is then re-actuated, since the question code signal is then received with greater field intensity.

In that case, the signal-to-noise ratio at the receiver 21 of the transponder 2 is better, for the same field intensity of the transmitter 10 of the transmitter and receiver unit 1.

The transmission of the answer code signal may also be forced by actuating the key 29, even though a satisfactory question code signal has not been received. This can then be exploited if a defect occurs either in the transmitter 10 of the transmitter and receiver unit 1 or in the receiver 21 of the transponder 2.

The transponder 2 may be in the form of a chip card or in the form of a conventional key for a lock, in which the transmitter 22 and/or 25, the receiver 21 and the battery 27 are disposed.

The antennas 11 or 12 may be disposed in the outside mirrors 46 of the vehicle 4 and/or in the inside mirror of the vehicle, or in the door. The radial antenna can also act as a receiving antenna for the stationary transmitter and receiver unit. Depending on the side from which the user approaches the vehicle 4 with the transponder 2 that he is carrying and enters into dialog with the transmitter and receiver unit 1, the central locking system can be controlled in such a way that only the door on that side is opened.

The access control device according to the invention may also be used for access control in buildings, such as hotels, or anywhere that access to premises is intended to be granted only to authorized users.

The access control device can also be used to prevent a vehicle from being driven. For that purpose, the authorized user must be seated on the driver's seat in the interior of the vehicle and carrying his or her transponder 2. In order to detect the position of the transponder, at least two antennas are disposed in the opposed outside mirrors or vehicle doors. Given suitable construction of the antennas, the question code signals transmitted by the left and right antenna are then superimposed on one another in the vehicle interior, specifically in the region of the driver's seat.

If an engine starting button is then actuated as the tripping means, a question and answer dialog takes place in the manner described above. If the user who has the transponder 2 is detected in the vehicle interior and is found to be authorized, then the engine is started. For safety's sake, still other conditions may also be interrogated before the engine is started, such as whether the vehicle brake has been actuated or the transmission is in the idling position.

We claim:

1. A remote-control access control device, comprising:

tripping means;

an unlocking unit;

a stationary transmitter and receiver unit responding to actuation of said tripping means for transmitting a question code signal with a field intensity, receiving an answer code signal, and furnishing an unlocking signal to said unlocking unit if the answer code signal matches a command code signal;

a portable transponder having a receiver receiving the question code signal, a transmitter transmitting the answer code signal, and a battery voltage; and said stationary transmitter and receiver unit repeatedly transmitting the question code signal if no answer code signal has been received in response to an initial transmission, and means for modifying a signal parameter upon transmission of the answer code signal as a function of one of the field intensity of the question code signal and the battery voltage of the transponder.

2. The access control device according to claim 1, wherein said transmitter and receiver unit has at least two transmission channels for receiving signals with different signal parameters.

3. The access control device according to claim 1, wherein said tripping means are a door handle being electrically connected to said transmitter and receiver unit.

4. The access control device according to claim 1, including a logic circuit, said tripping means being a key of said transponder being electrically connected through said logic circuit to said transmitter.

5. The access control device according to claim 1, including a main voltage source connected to said transmitter and receiver unit, and an emergency voltage source connected to said transmitter and receiver unit for supplying said transmitter and receiver unit and said unlocking unit with energy as needed, in the event of failure of said main voltage source, if the answer code signal received matches the command code signal.

6. The access control device according to claim 1, wherein said transmitter and receiver unit is disposed in a motor vehicle.

7. The access control device according to claim 1, wherein said tripping means are a question code signal being transmitted cyclically at time intervals by said transmitter and receiver unit.

8. The access control device according to claim 1, wherein said transponder has an emergency voltage source for buffer-storing or drawing some energy contained in the question code signal being sufficient to transmit the answer code signal, if there is an inadequate energy supply in said transponder.

9. A remote-control access control device, comprising:

tripping means;

an unlocking unit;

a stationary transmitter and receiver unit responding to actuation of said tripping means for transmitting a question code signal, receiving an answer code signal, and furnishing an unlocking signal to said unlocking unit if the answer code signal matches a command code signal;

a portable transponder having a receiver receiving the question code signal and a transmitter transmitting the answer code signal; and means for modifying a signal parameter when the answer code signal is transmitted if an information content of the question code signal indicates an emergency operation state.

10. The access control device according to claim 9, wherein said transmitter and receiver unit has at least two transmission channels for receiving signals with different signal parameters.

11. The access control device according to claim 9, wherein said tripping means are a door handle being electrically connected to said transmitter and receiver unit.

12. The access control device according to claim 9, including a logic circuit, said tripping means being a key of said transponder being electrically connected through said logic circuit to said transmitter.

13. The access control device according to claim 9, wherein said tripping means are a question code signal being transmitted cyclically at time intervals by said transmitter and receiver unit.

14. The access control device according to claim 9, wherein said transponder has an emergency voltage source for buffer-storing or drawing some energy contained in the question code signal being sufficient to transmit the answer code signal, if there is an inadequate energy supply in said transponder.

15. The access control device according to claim 9, including a main voltage source connected to said transmitter and receiver unit, and an emergency voltage source connected to said transmitter and receiver unit for supplying said transmitter and receiver unit and said unlocking unit with energy as needed, in the event of failure of said main voltage source, if the answer code signal received matches the command code signal.

16. The access control device according to claim 9, wherein said transmitter and receiver unit is disposed in a motor vehicle.

17. remote-control access control device, comprising:

tripping means;

an unlocking unit;

a stationary transmitter and receiver unit responding to actuation of said tripping means for transmitting a question code signal, receiving an answer code signal, and furnishing an unlocking signal to said unlocking unit if the answer code signal matches a command code signal; and a portable transponder having a transmitter transmitting the answer code signal and a receiver receiving the question code signal;

said transmitter and receiver unit having both a transmission channel for receiving signals of low field intensity and a transmission channel for receiving signals of high field intensity.

18. The access control device according to claim 17, wherein said tripping means are a door handle being electrically connected to said transmitter and receiver unit.

19. The access control device according to claim 17, including a logic circuit, said tripping means being a key of said transponder being electrically connected through said logic circuit to said transmitter.

20. The access control device according to claim 17, wherein said tripping means are a question code signal being transmitted cyclically at time intervals by said transmitter and receiver unit.

21. The access control device according to claim 17, wherein said transponder has an emergency voltage source for buffer-storing or drawing some energy contained in the question code signal being sufficient to transmit the answer code signal, if there is an inadequate energy supply in said transponder.

22. The access control device according to claim 17, including a main voltage source connected to said transmitter and receiver unit, and an emergency voltage source connected to said transmitter and receiver unit for supplying said transmitter and receiver unit and said unlocking unit with energy as needed, in the event of failure of said main voltage source, if the answer code signal received matches the command code signal.

23. The access control device according to claim 17, wherein said transmitter and receiver unit is disposed in a motor vehicle.

24. The access control device according to claim 17, wherein the answer code signal is received simultaneously by both of said transmission channels.

25. A method for operating a remote-access control device, which comprises:

transmitting a question code signal from a stationary transmitter and receiver unit upon actuation of tripping means;

receiving the question code signal at a transponder and transmitting an answer code signal from the transponder to the transmitter and receiver unit;

comparing the answer code signal with a command code signal in the transmitter and receiver unit, and sending an unlocking signal to an unlocking unit if the answer code signal and the command code signal match;

bringing the transponder to the vicinity of the transmitter and receiver unit and modifying a signal parameter if no unlocking signal has been tripped after the initial actuation of the tripping means; and actuating the tripping means once again for transmitting the question code signal.

26. The method according to claim 25, which comprises transmitting a further question code signal from the transmitter and receiver unit if further tripping means are actuated, thereupon transmitting a further answer code signal from the transponder if the transponder is detected as being located inside a motor vehicle, and transmitting an engine starting signal from a control unit disposed in the vehicle, if the answer code signal matches a command code signal.

* * * * *